United States Patent
Tang et al.

(10) Patent No.: US 9,413,862 B2
(45) Date of Patent: Aug. 9, 2016

(54) APPARATUS ENABLING AUTOMATICALLY ADJUSTING FUNCTIONS OF COMPONENTS THEREOF

(71) Applicants: Qi Tang, Shenzhen (CN); Hongxing Wang, Shenzhen (CN)

(72) Inventors: Qi Tang, Shenzhen (CN); Hongxing Wang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 10 days.

(21) Appl. No.: 14/243,056

(22) Filed: Apr. 2, 2014

(65) Prior Publication Data
US 2014/0302836 A1    Oct. 9, 2014

(30) Foreign Application Priority Data
Apr. 5, 2013 (CN) .......................... 2013 1 0118717

(51) Int. Cl.
*H04M 1/03*    (2006.01)
*H04M 1/725*   (2006.01)

(52) U.S. Cl.
CPC ............ *H04M 1/03* (2013.01); *H04M 1/72569* (2013.01); *H04M 2250/12* (2013.01)

(58) Field of Classification Search
CPC ............................. H04M 1/03; H04M 1/72569
USPC .......................... 455/418; 340/12.55; 381/322
See application file for complete search history.

(56) References Cited

U.S. PATENT DOCUMENTS

| | | | | |
|---|---|---|---|---|
| 2001/0011993 A1* | 8/2001 | Saarinen | ...................... | 345/156 |
| 2006/0164043 A1* | 7/2006 | Ukon | ............................ | 320/162 |
| 2009/0122147 A1* | 5/2009 | Takashima | ............... | 348/207.99 |
| 2010/0195838 A1* | 8/2010 | Bright | ..................... | H04M 1/03 381/57 |
| 2010/0227642 A1* | 9/2010 | Kim et al. | .................. | 455/556.1 |
| 2011/0117902 A1* | 5/2011 | Chang et al. | ................. | 455/418 |
| 2012/0316869 A1* | 12/2012 | Xiang | ..................... | H04K 1/02 704/226 |
| 2013/0275873 A1* | 10/2013 | Shaw | .................... | G01S 3/8006 715/716 |

* cited by examiner

*Primary Examiner* — Kamran Afshar
*Assistant Examiner* — Ather Mohiuddin
(74) *Attorney, Agent, or Firm* — IPro, PLLC; Na Xu; Qian Gu

(57) ABSTRACT

An apparatus for automatic switching functions of components thereof, includes a housing having an upper end and a lower end, a first microphone fixed on the upper end of the housing, a second microphone fixed on the lower end of the housing, an orientation detecting unit having an acceleration sensor for detecting the current orientation of the apparatus for generating an orientation signal, a switching control unit for switching the functions of the microphones when the orientation signal indicates the apparatus is reversed.

1 Claim, 3 Drawing Sheets

APPARATUS ENABLING AUTOMATICALLY ADJUSTING FUNCTIONS OF COMPONENTS THEREOF

RELATED PATENT APPLICATION

This application claims the priority benefit of Chinese Patent Application Filing Serial Number CN 201310118717.1, the disclosure of which is herein incorporated by reference in its entirety.

FIELD OF THE INVENTION

The present disclosure generally relates to the art of mobile terminals, and more particularly to a mobile terminal and a method for automatically adjusting functions of components in the terminal according to the state of the mobile terminal.

DESCRIPTION OF RELATED ARTS

With the rapid development of the portable devices such as cellular phones and notebook computers, people request for more and more functions. Recently, portable terminals are being widely used as necessities of modern persons without distinction of age and gender. Service providers and terminal manufacturers are competitively developing products (or services) for differentiation from other competitors. For example, the portable terminals have been developed to be multimedia devices that include capability for phonebooks, games, a Short Message Service (SMS), Electronic (E)-mails, morning calls, Motion Picture Expert Group Audio Layer-3 (MP3), schedule managing functions, digital cameras, wireless Internet services to provide various services, and the like.

Generally, a related mobile terminal usually only has one receiver. Users usually have to take the receiver close to ear when answering the phone. For mobile terminals, the phone's appearance design is very simple. The appearance of the phone is designed to be symmetrical for beauty. It becomes more and more difficult to distinguish between upper and lower ends of the phone. According to statistics, about 50 percent of the users who pick up the mobile phones from the pockets or the desks hold the mobile phone upside-down, and then they need to turn the mobile phone manually. Before answering the phone, the users need to confirm that the phone is held in correct orientation.

As the general mobile phone provides the users with not so good experience, there's a need to provide an improved mobile terminal, such as a mobile phone, to solve the problems mentioned above.

DETAILED DESCRIPTION OF THE EXEMPLARY EMBODIMENTS

Reference will now be made to describe the exemplary embodiment of the present disclosure in detail.

Figure 1:
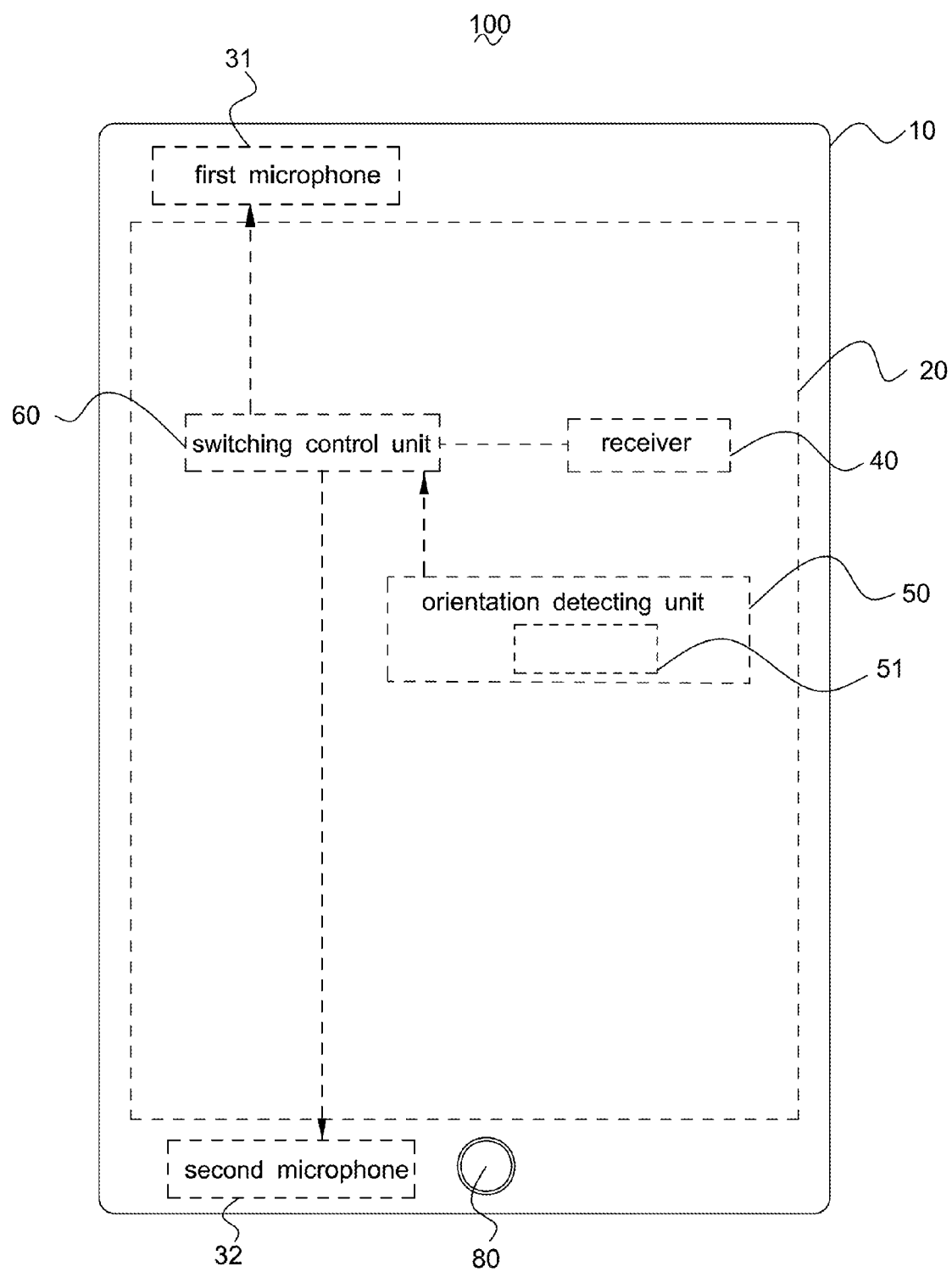
FIG. 1 is a schematic of an apparatus for automatically adjusting functions of components therein in accordance with a first exemplary embodiment of the present disclosure, the apparatus being held at a normal orientation.

Referring to FIG. 1, the exemplary embodiment of the present invention discloses an apparatus 100 for automatically adjusting functions of components therein. The apparatus 100 has a configuration of a substantially rectangular mass. Specifically, the apparatus 100 has a housing with a rectangular shape having an upper end and a lower end far away from the upper end. The housing has a receiving space. The receiving space of the housing supporting a display screen 20 used to display various information to the user served as a user interface, a receiver 40 for converting audio signals to audible voices, a first microphone 31 located at an upper end of the housing 10, and a second microphone 32 located at a lower end of the housing 10. In alternative embodiments, the display screen may be a part of the housing.

In addition, the apparatus 100 further includes an orientation detecting unit 50 for detecting the current orientation of the apparatus 100, and a switching control unit 60 electrically connecting with the orientation detecting unit 50. The orientation detecting unit 50 has an acceleration sensor 51. The switching control unit 60 is configured to control the work mode of the first and second microphones according to the orientation of the apparatus 100.

In this embodiment, a home button 80 is shown. But be noted that this home button 80 is shown just for distinguishing the orientation of the apparatus 100. In many cases, the home button 80 is an unnecessary component. As shown in FIG. 1, the home button 80 is located at the lower end of the housing 10, which indicates that the current orientation is a normal orientation. Another word, the home button 80 is just a reference for a person with ordinary skills in the art to easily understand the orientation of the apparatus. Without the home button 80, the principle of the present disclosure is the same.

At the normal orientation, the first microphone is configured to receive environmental noises for noise cancelling. The second microphone is configured to receive the user's voice and then convert the voice to electrical signals. The receiver 40 in the present embodiment is a component for converting audio signals to voices. Optionally, the receiver 40 is a sound generator which generates voice by vibration of the display screen or the housing.

Even though, as some components, such as an antenna, a CPU, a battery and a communication unit are not illustrated in the drawing, but they are necessary components to manufacture a finished mobile phone. Some components can be obtained in the public-know arts.

Figure 2:
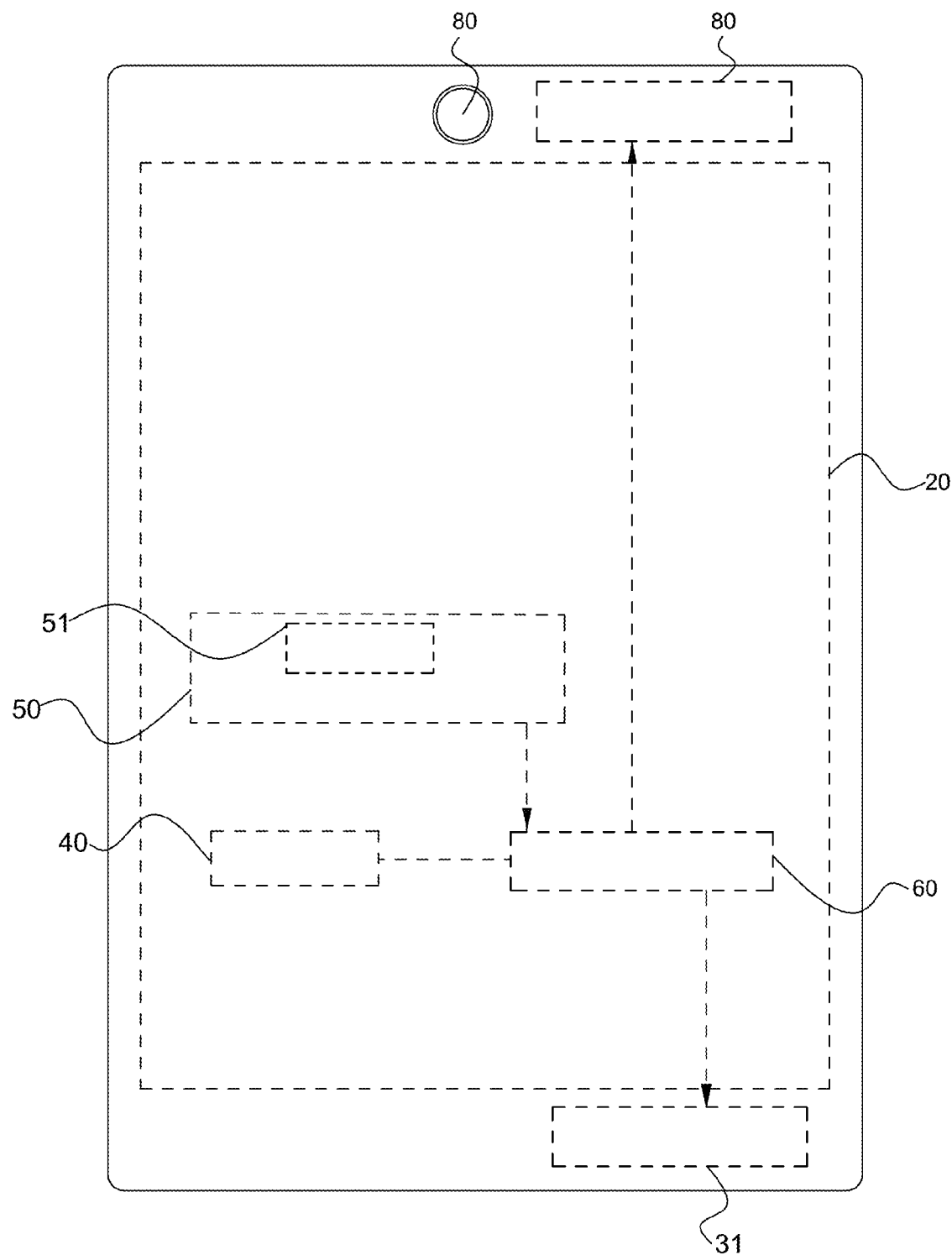
FIG. 2 is similar to FIG. 1, but the apparatus is held at a reverse orientation.

Referring to FIG. 2, when the apparatus 100 is held at a reverse orientation, which is indicated by the home button 80, the orientation detecting unit 50 gets an orientation signal indicating the current orientation of the apparatus 100 by the acceleration sensor 51. The orientation signal is transmitted to the switching control unit 60 by the orientation detecting unit 50. After the switching control unit 60 gets the orientation signal, it switched the work modes of the first and second microphones, i.e., the first microphone 31 is switched to receive the user's voices, and the second microphone 32 is switched to receive environmental noises. By virtue of the automatically adjusting configuration, the user does not need to correct the orientation of the apparatus 100 for normally answering the calls. What the user needs to do is just pick up the phone, regardless of the orientation of the phone, and answer the call.

Figure 3:
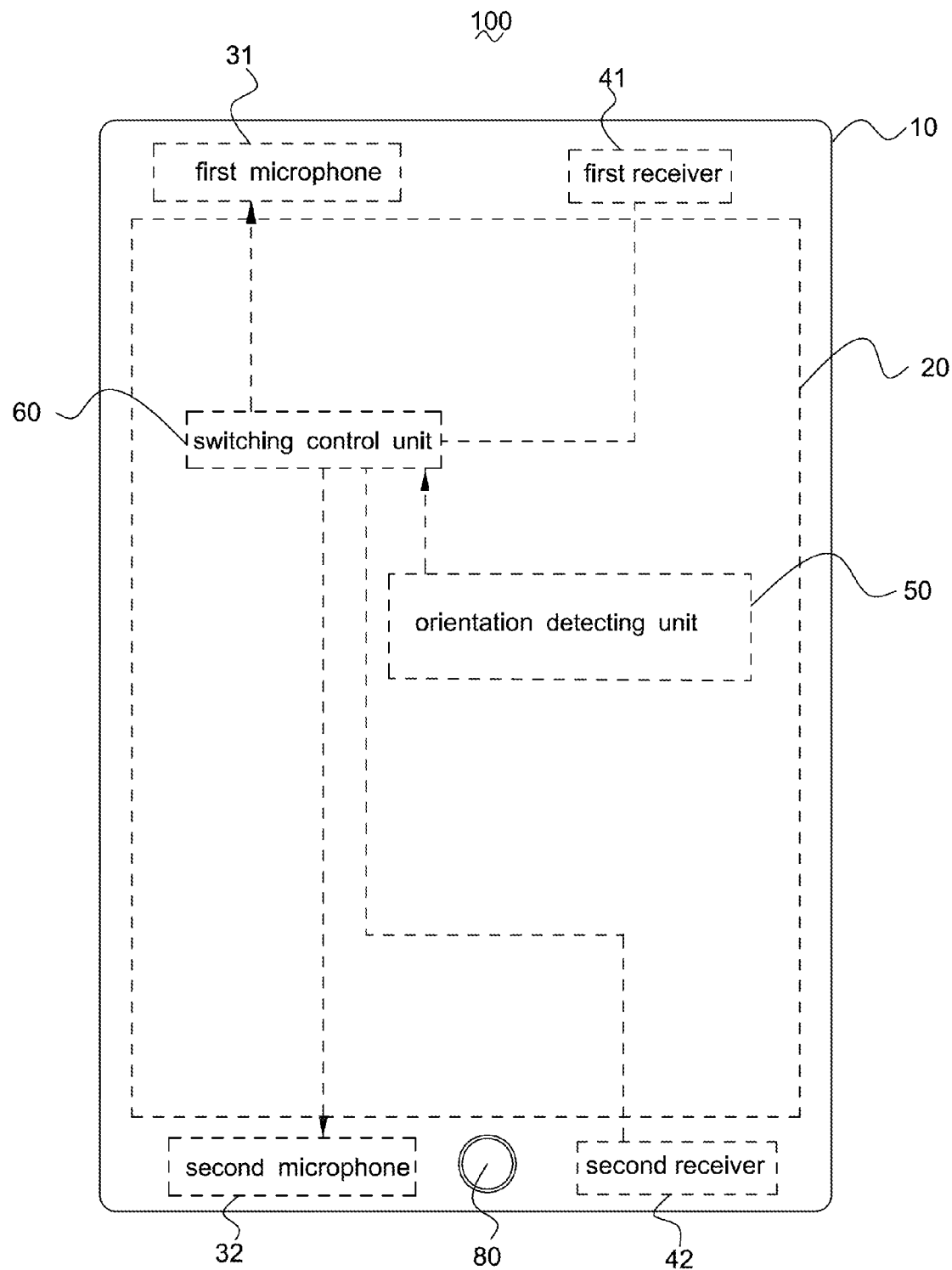
FIG. 3 is a schematic of an apparatus in accordance with a second embodiment of the present disclosure.

Referring to FIG. 3, which shows a second embodiment of the present disclosure, the apparatus 100 uses a first receiver 41 and a second receiver 42 to replace the receiver in the first embodiment. In this embodiment, the first and second receivers 41, 42 are typical receivers for converting audio signals into voices. The first receiver 41 is located at the upper end of the housing 10, and the second receiver 42 is located at the lower end of the housing 10. At the normal orientation, the first receiver 41 works normally (voice mode), and the second receiver 42 does not work (silent mode). When the apparatus 100 is reversed, the first receiver 41 is switched by the switching control unit 60 to silent mode, and the second receiver 42 is switched by the switching control unit 60 to voice mode. Other components shown in FIG. 3 but not mentioned have the same configurations and functions to the first embodiment.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A mobile phone for automatic adjusting functions of components thereof, comprising:

a housing having a configuration of a substantially rectangular mass and including an upper end and a lower end opposed to the upper end;

a first microphone mounted on the upper end of the housing and a second microphone mounted on the lower end of the housing, each of the first and second microphones having a function of receiving environmental noises for noise cancelling and a function of receiving voices;

an orientation detecting unit including an acceleration sensor for detecting a current orientation of the mobile phone, and for generating an orientation signal according to the current orientation of the mobile phone;

a switching control unit for receiving the orientation signal, and further for switching the first microphone between the function of receiving environmental noises and the function of receiving voices, and for switching the second microphone to work on the function different from the function that the first microphone works on;

at least two receivers mounted in the housing for converting audio signals into voices, one of the receivers located at the upper end of the housing and the other located at the lower end of the housing.

* * * * *